(12) United States Patent
Kammleiter

(10) Patent No.: US 9,473,063 B2
(45) Date of Patent: Oct. 18, 2016

(54) PROTECTIVE CIRCUITRY FOR INSULATION DAMAGE DUE TO FAILURE OF INTERMEDIATE CIRCUIT CAPACITORS

(71) Applicant: ebm-papst Mulfingen GmbH & Co. KG, Mulfingen (DE)

(72) Inventor: Steffen Kammleiter, Assamstadt (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 2 days.

(21) Appl. No.: 14/247,279

(22) Filed: Apr. 8, 2014

(65) Prior Publication Data

US 2014/0333245 A1 Nov. 13, 2014

(30) Foreign Application Priority Data

May 10, 2013 (DE) .................. 10 2013 104 847

(51) Int. Cl.

| | |
|---|---|
| H02H 7/09 | (2006.01) |
| H02P 29/02 | (2016.01) |
| H02H 7/16 | (2006.01) |
| H02M 7/06 | (2006.01) |
| H02P 6/14 | (2016.01) |
| H02P 6/16 | (2016.01) |
| H02P 6/00 | (2016.01) |
| H02H 7/08 | (2006.01) |
| H02M 5/45 | (2006.01) |

(52) U.S. Cl.
CPC .............. *H02P 29/024* (2013.01); *H02H 7/16* (2013.01); *H02M 7/062* (2013.01); *H02P 29/0241* (2016.02); *H02H 7/0833* (2013.01); *H02M 5/45* (2013.01); *H02P 6/002* (2013.01); *H02P 6/14* (2013.01); *H02P 6/16* (2013.01)

(58) Field of Classification Search
CPC ............ H02P 6/002; H02P 6/14; H02P 6/16; H02P 29/02; H02H 7/0833
USPC ..................................................... 318/400.22
See application file for complete search history.

(56) References Cited

U.S. PATENT DOCUMENTS

| | | | | |
|---|---|---|---|---|
| 4,568,871 | A * | 2/1986 | Bauman ................. | H02M 5/45 323/364 |
| 2006/0238940 | A1* | 10/2006 | Komulainen et al. ....... | 361/91.1 |
| 2007/0222299 | A1* | 9/2007 | Pickett et al. ................ | 307/105 |
| 2011/0038086 | A1* | 2/2011 | Eggert et al. ................ | 361/93.9 |
| 2011/0110128 | A1* | 5/2011 | Malik ................. | H02H 7/1255 363/52 |

* cited by examiner

*Primary Examiner* — Shawki S Ismail
*Assistant Examiner* — Bradley Brown
(74) *Attorney, Agent, or Firm* — Harness, Dickey & Pierce, P.L.C.

(57) ABSTRACT

The present disclosure relates to an intermediate circuit for an EC motor, comprising at least two similar series-connected capacitors for the connection of an electronic commutation device of an EC motor for nominal operation at a nominal voltage. In each case, a varistor is connected in parallel to each series-connected capacitor, wherein all the varistors are designed similarly. The capacitors and the varistors are dimensioned so that the threshold voltage of the varistors is less than the breakdown voltage of the respective parallel-connected capacitor, and, in the case of the failure of a capacitor or of a varistor, the sum of the threshold voltages of the remaining varistors is smaller than/equal to the nominal voltage of the intermediate circuit, and the sum of the threshold voltages of the series-connected varistors is greater than the nominal voltage of the intermediate circuit.

3 Claims, 1 Drawing Sheet

Figure 1:
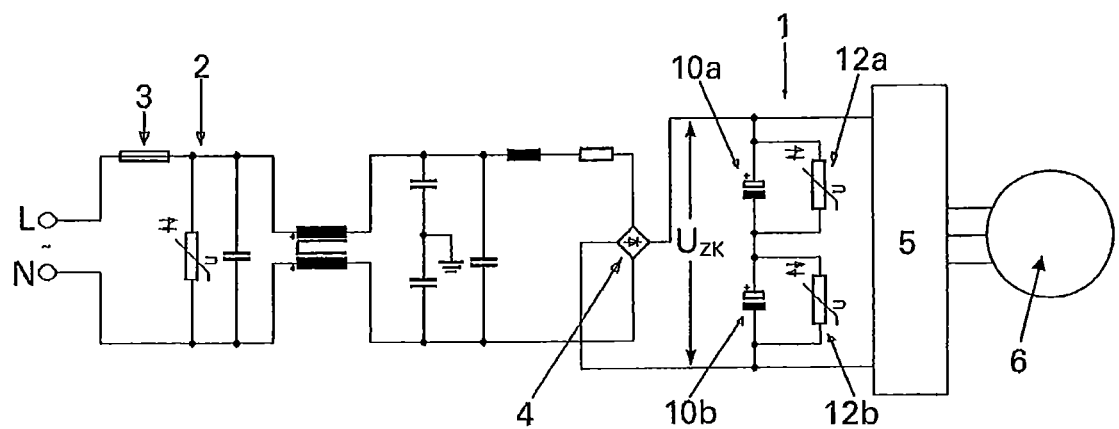

PROTECTIVE CIRCUITRY FOR INSULATION DAMAGE DUE TO FAILURE OF INTERMEDIATE CIRCUIT CAPACITORS

CROSS-REFERENCE TO RELATED APPLICATIONS

This application claims the benefit and priority of German patent application number 10 2013 104 847.1, filed May 10, 2013. The entire disclosure of the above application is incorporated herein by reference.

FIELD

The present disclosure relates to an intermediate circuit for an EC motor, comprising at least two similar series-connected capacitors for the connection of an electronic commutation device of an EC motor, for nominal operation at a nominal voltage. The disclosure further relates to an EC motor having such an intermediate circuit.

BACKGROUND

This section provides background information related to the present disclosure which is not necessarily prior art.

Such intermediate circuits are generally used for space and cost reasons instead of intermediate circuits having a single larger capacitor.

Intermediate circuits of electric motors are checked for malfunction in the context of a failure simulation, which takes place for product certification and for checking compliance in the sense of the low voltage guideline. Here, for example, the effects of a failure of a capacitor are also verified by means of a short-circuit in the capacitor that has failed. Due to the short-circuit of a capacitor in the series connection, an excess voltage occurs over the remaining series-connected capacitors. Under some circumstances, this leads to a bursting of a capacitor, and the electrolyte material of the burst capacitor that is released as a result is dispersed in particular on the conductor plate of the intermediate circuit. The conductor plate of the intermediate circuit comprises a base insulation for the required insulation between the network circuit and contactable metal parts, which prevents the risk of an electric shock. As a result of the electrolyte accumulation in the area of the base insulation of the conductor plate, tracking between the power supply circuit and contactable metal parts is increased, and a high-voltage test in the context of the verification of the compliance with the low voltage guideline can no longer be passed successfully. Therefore, the fault simulation has a negative result.

In the case of known intermediate circuits, a bursting of the capacitors is prevented, for example, by additional fuses connected in series before the component. However, fuses arranged before the component respond due to an excess current, and thus only when the bursting capacitor causes this high current, so that the capacitor in some cases still can burst. Fuses for the high direct-current voltages in the intermediate circuit moreover are quite large and they also cause relatively high costs. Alternatively or additionally, in known intermediate circuits, a dispersing of electrolyte material is prevented by a special encapsulation of the capacitors. An encapsulation on a conductor plate is expensive and it causes additional costs, and, depending on the circuit, it cannot be implemented so that the electrolyte does not reach any other region of the circuit. These solutions are complicated, cost intensive and they require a relatively large installation space.

SUMMARY

This section provides a general summary of the disclosure, and is not a comprehensive disclosure of its full scope or all of its features.

The disclosure is based on the problem of allowing the compliance of an intermediate circuit with the low voltage guideline in the case of a short-circuit test of a capacitor in the most simple, reliable, cost effective and space-saving manner possible.

This problem is solved according to the disclosure in that a varistor is connected in each case in parallel with each series-connected capacitor, wherein all the varistors are designed similarly, and the capacitors and the varistors are dimensioned so that the threshold voltage of the varistors is below the breakdown voltage of the respective parallel-connected capacitor, and, in the case of the failure of a capacitor or of a varistor, the sum of the threshold voltages of the remaining varistors, respectively of the varistors parallel-connected to the remaining capacitors, is smaller than/equal to the nominal voltage of the intermediate circuit, and the sum of the threshold voltages of the series-connected varistors is greater than the nominal voltage of the intermediate circuit.

Since the threshold voltage of the varistor is less than the breakdown voltage of the capacitor, and since the varistors are dimensioned in such a manner that, in the case of a failure of a varistor, the sum of the threshold voltages of the remaining varistors is smaller than/equal to the nominal voltage of the intermediate circuit, it is ensured that, as soon as a capacitor or a varistor fails, the partial nominal voltage at the remaining varistors exceeds their respective threshold voltage. As a result, the resistance of the remaining varistors is strongly reduced, so that the operating voltage at the parallel-connected capacitor decreases immediately, and the breakdown voltage cannot be reached, so that the capacitor is protected reliably against bursting. Since the sum of the threshold voltages of the varistors is greater than the nominal voltage of the intermediate circuit, it is ensured in nominal operation with all the operative capacitors that the threshold voltage of the varistors is not reached at nominal voltage of the intermediate circuit. The resistance of the varistor is relatively high below the threshold voltage, and in nominal operation, a partial nominal voltage, which is smaller than the threshold voltage, is applied to each capacitor, respectively to each varistor connected in parallel thereto. The normal operating capacity of the intermediate circuit is ensured as a result. In comparison to the known fuses before the electrolyte capacitor, the advantage is that the varistor already short-circuits the capacitor before the bursting of the capacitor. In addition, the varistors are more advantageous particularly in comparison to encapsulations and they require less installation space resulting in space saving or savings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details, features and advantageous variants of the disclosure result from the embodiment examples described below and represented in the drawings.

Figure 2:
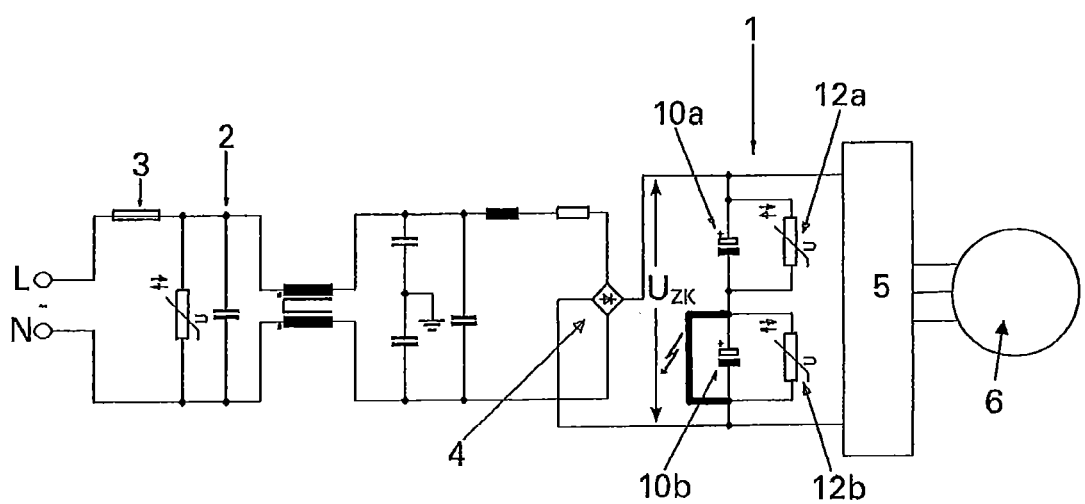

FIG. 1 shows a block diagram of an intermediate circuit according to the disclosure with power supply inlet circuitry, fuse and rectifier in nominal operation, and FIG. 2 shows a block diagram of an intermediate circuit according to the disclosure with power supply inlet circuitry, fuse and rectifier in the fault case.

In the various figures of the drawings, similar parts are always provided with the same reference numerals.

DETAILED DESCRIPTION

Example embodiments will now be described more fully with reference to the accompanying drawings.

Regarding the following description, it is explicitly emphasized that the disclosure is not limited to the embodiment examples and is not limited thereby to all or several of the features of described combinations of features; instead, each individual partial feature of the/of each embodiment example can also have an inventive meaning by itself separate from all the other partial features described in the context thereof and also in combination with any features of another embodiment example as well as also independently of the combinations of features and the references of the claims.

In FIG. 1, an intermediate circuit 1 according to the disclosure with a power supply inlet circuitry 2 with fuse 3 and a rectifier 4 is represented in nominal operation. The intermediate circuit 1 is connected via an electronic commutation device 5 to a motor 6. The intermediate circuit 1 is operated in nominal operation with a nominal voltage $U_{ZK}$ which is generated by the power supply inlet circuitry 2 and the rectifier 4. Here there is a nominal current $I_N$ flow for which the fuse 3 of the power supply inlet circuitry is sufficiently dimensioned. The intermediate circuit comprises several series-connected capacitors 10a, 10b. The capacitors 10a, 10b are designed so that they are similar to one another, in particular with the same breakdown voltage and capacitance. Here, the breakdown voltage is dimensioned so that the sum of the breakdown voltages of all the series-connected capacitors 10a, 10b is greater than the nominal voltage $U_{ZK}$ of the intermediate circuit.

The represented embodiment of the intermediate circuit 1 comprises two capacitors 10a, 10b, in particular two electrolyte capacitors. In principle, an intermediate circuit 1 according to the disclosure can also comprise more than two series-connected capacitors 10a, 10b. In nominal operation, in the represented embodiment, a partial nominal voltage of $U_{ZK}/2$ is applied to the capacitors 10a, 10b. The breakdown voltage of the capacitors 10a, 10b in each case is greater than $U_{ZK}/2$.

With respect to the series-connected capacitors 10a, 10b, a varistor 12a, 12b is in each case connected in parallel to each capacitor 10a, 10b. Here, the varistors 12a, 12b are also dimensioned so they are similar to one another, in particular with the same threshold voltage which is typical for the respective varistor.

The varistors 12a, 12b are dimensioned so that the sum of the threshold voltages of the series-connected varistors 12a, 12b is greater than the nominal voltage $U_{ZK}$ of the intermediate circuit 1. In the represented embodiment, the threshold voltage of the varistors 12a, 12, is greater than the partial nominal voltage $U_{ZK}/2$. As a result, in nominal operation, the partial nominal voltage at the individual capacitors 10a, 10b and the parallel-connected varistors 12a, 12b is smaller in each case than the threshold voltage of the respective varistor 12a, 12b. In nominal operation, the resistance of the varistor 12a, 12b has a relatively high ohm value, so that the capacitor is not short-circuited. This prevents the varistor from causing a short-circuit already in nominal operation.

For the capacitors 10a, 10b to be protected in the case of a fault, the capacitors 10a, 10b and the varistors 12a, 12b are dimensioned so that the threshold voltage of the varistors 12a, 12b is less than the breakdown voltage of the respective parallel-connected capacitor 10a, 10b, and, in the case of the failure of a capacitor 10a, 10b or of a varistor 12a, 12b, the sum of the threshold voltages of the remaining varistors 12a, 12b, respectively of the varistors 12a, 12b which are parallel-connected to the remaining capacitors 10a, 10b, is smaller than/equal to the nominal voltage $U_{ZK}$ of the intermediate circuit 1.

For the represented embodiment, it is true that the breakdown voltage of the capacitors 10a, 10b>threshold voltage of the varistors 12a, 12b, and the nominal voltage $U_{ZK}$≥threshold voltage of the varistors 12a, 12b>$U_{ZK}/2$.

In FIG. 2, the same circuit is represented in the case of a fault, in particular in the case of a short circuit in one of the capacitors 10a, 10b. In order to prevent damage to the insulation due to the failure of the capacitor 10a, 10b series-connected to an additional capacitor 10a, 10b, a bursting of the capacitor 10a, 10b must be prevented. The bursting of the capacitor 10a, 10b does not occur immediately after the application of the excess voltage.

In the case of a failure of the capacitor 10b, the parallel-connected varistor 12b is short-circuited, and the partial nominal voltage at the remaining capacitor 10a and thus also at the varistor 12a parallel-connected to said capacitor increases. In the represented embodiment example, the partial nominal voltage at the capacitor 10a and the varistor 12a can increase up to two-fold. If the partial nominal voltage increases above the breakdown voltage of the capacitor 10a, there would be a risk of the capacitor 10a bursting. However, since the threshold voltage of the varistor 12a is smaller than the breakdown voltage of the capacitor 10a, the differential resistance of the varistor 12a becomes abruptly smaller and it short-circuits the parallel-connected capacitor 10a, so that the partial nominal voltage at the capacitor 10a decreases before reaching its breakdown voltage.

Due to the defined short-circuit by means of the varistor 12a, there is an excess current flow, so that the fuse 3 of the power supply input circuit responds and the overall circuit is switched off.

FIG. 1 and FIG. 2 show an electronic device with a uniphase power supply. However, the arrangement of the capacitors 10a, 10b and of the varistors 12a, 12b as a protective circuitry also applies to electronic devices with multiphase power supply.

The disclosure is not limited to the represented and described embodiment examples; instead it comprises also all the embodiments that have the same effect in the sense of the invention. It is explicitly emphasized that the embodiment examples are not limited to all the features in combination; instead, each individual partial feature can also have an inventive meaning by itself separate from all the other partial features. Furthermore, the disclosure heretofore is also not yet limited to the combination of features which is defined in the respective independent claim; instead, it can also be defined by any other desired combination of certain features of all the individual features disclosed in total. This means that in principle practically any individual feature of the respective independent claim can be omitted or replaced by at least one individual feature disclosed elsewhere in the application. To that extent, the claims should be understood to be merely a first attempt at formulating an invention.

What is claimed is:

1. An intermediate circuit for an EC motor, comprising:
   at least two similar series-connected capacitors for the connection of an electronic commutation device of an EC motor for nominal operation at a nominal voltage,
   a varistor connected in parallel to each series-connected capacitor, and
   a fuse, wherein
   all the varistors are designed similarly, and the capacitors and the varistors are dimensioned so that a threshold voltage of each of the varistors is less than a breakdown voltage of a respective parallel-connected capacitor,
   in a case of the failure of one of the capacitors or the failure of one of the varistors, a sum of the threshold voltages of the remaining varistors, connected in parallel to the remaining capacitors, is smaller than/equal to a nominal voltage of the intermediate circuit,
   a sum of the threshold voltages of the series-connected varistors is greater than the nominal voltage of the intermediate circuit,
   one of the remaining varistors creates a defined short-circuit such that excess current flows, and
   in response to the excess current flow due to the defined short-circuit created by the one of the remaining varistors, the fuse is activated and the intermediate circuit is switched off as soon as a partial nominal voltage of a respective one of the remaining capacitors increases above the threshold voltage of the one of the remaining varistors.

2. An EC motor with an intermediate circuit according to claim 1.

3. The intermediate circuit for an EC motor according to claim 1, wherein if the partial nominal voltage of the respective one of the remaining capacitors increases above the threshold voltage of the one of the remaining varistors, the differential resistance of the one of the remaining varistors becomes abruptly smaller and short circuits the respective one of the remaining capacitors so that the partial nominal voltage at the one of the remaining capacitors decreases before reaching the breakdown voltage of the one of the remaining capacitors.

* * * * *